June 22, 1926.
A. L. DITTMER
1,589,518
CINEMATOGRAPH MACHINE SAFETY DEVICE
Filed Jan. 15, 1924    2 Sheets-Sheet 1
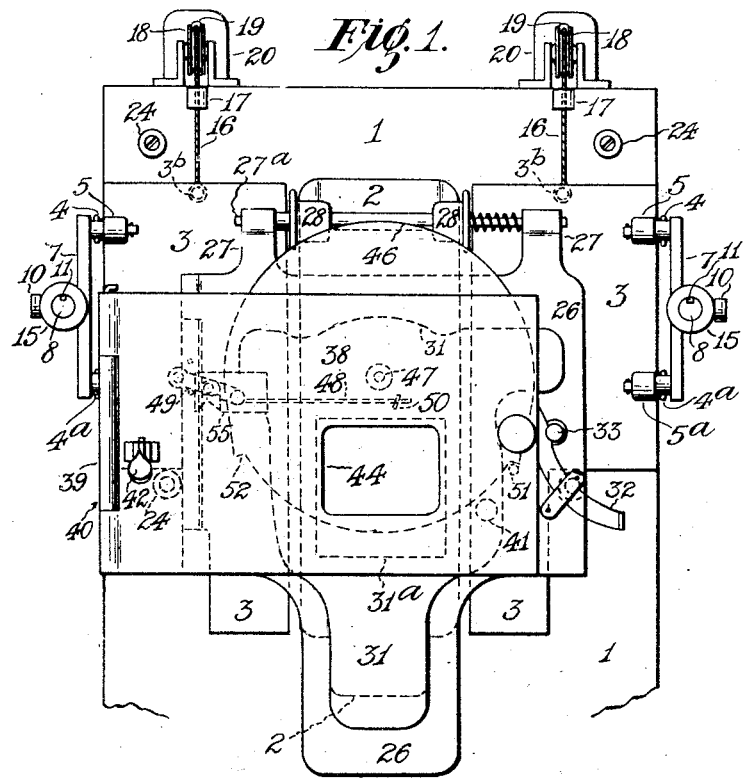

June 22, 1926.                                                    1,589,518
A. L. DITTMER
CINEMATOGRAPH MACHINE SAFETY DEVICE
Filed Jan. 15, 1924        2 Sheets-Sheet 2
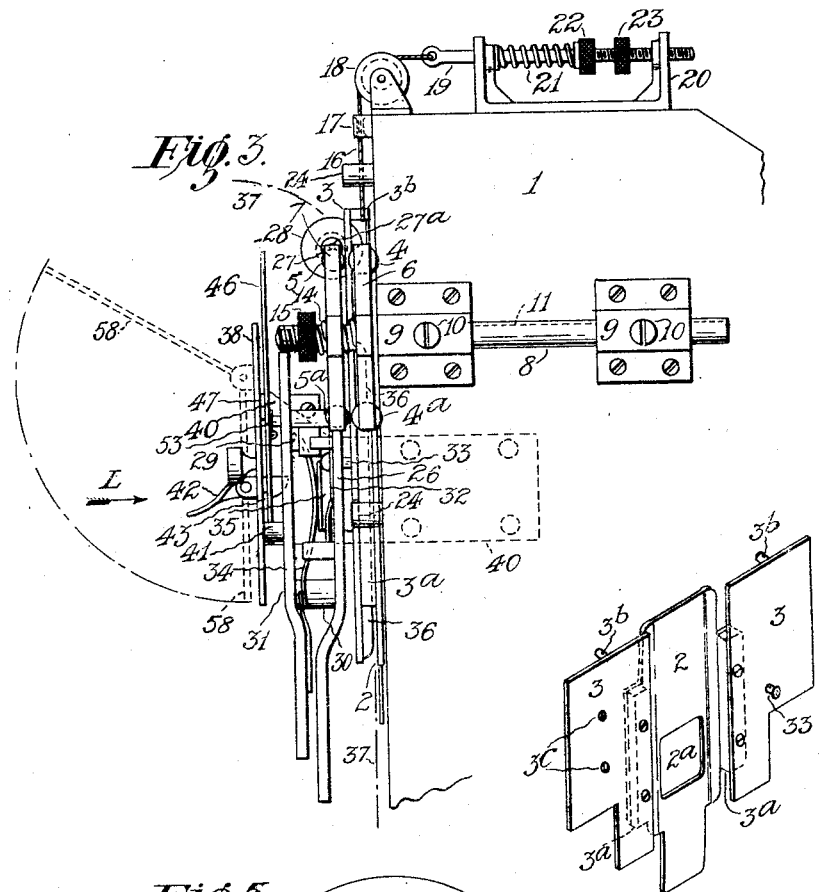
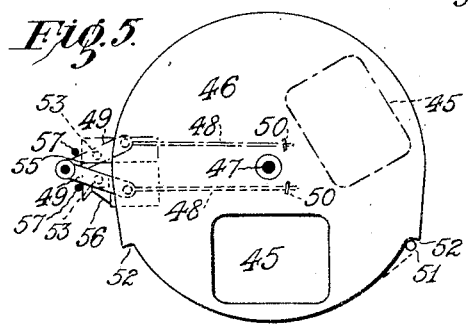
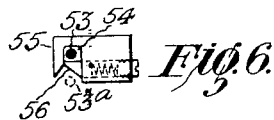
Inventor
A. L. Dittmer
By Marks & Clerk
Attys.

Patented June 22, 1926.

1,589,518

UNITED STATES PATENT OFFICE.

ARTHUR LESLIE DITTMER, OF CARLTON, VICTORIA, AUSTRALIA.

CINEMATOGRAPH-MACHINE SAFETY DEVICE.

Application filed January 15, 1924, Serial No. 686,449, and in Australia November 27, 1923.

Cinematograph safety devices, for cutting off light rays from the film, do not so far as I am aware, cut off the light when the film stops temporarily owing to worn or damaged sprocket holes in the film. These stoppages in some cases, allow the film to become ignited. The operator must give attention to prevent such ignition as the cinematograph continues in motion when the film so stops, and vision only indicates the stoppage to the operator. I provide devices to cut the light off each time the film so stops, and when the film breaks, and also when the machine stops.

I provide a movable apertured plate, which is drawn into normal working position (as downwardly) by tensioned film passing between it and spring shoes on the film gate, which I hinge to the said plate and which plate is retracted (as upwardly) when the tension on the film ceases.

The downward movement of the apertured plate brings an apertured shutter into normal working position so that when the film is moving properly, during operation of the cinematograph with the apertured plate lowered, the film is exposed to light rays which pass through a masking aperture in a rear plate. The shutter leaves the said normal working position upon return movement of the apertured plate, and thus intercepts the light rays.

I combine with my safety devices, if desired, a second shutter, which is well known, and which will in known manner be governed to close if the machine stops, or is sufficiently slowed, even though film tension be maintained. In the accompanying drawings I illustrate my invention as applied to a shutter of rotary type operated by movement of the apertured plate, but the details of the shutter and its movement may be varied while still retaining features herein claimed.

In these drawings, Figure 1 is a front elevation showing my apertured plate and parts adajcent thereto.

Figure 2 is a plan of the parts in Figure 1.

Figure 3 is a side elevation of the parts in Figure 1.

Figure 4 shows my movable apertured plate in perspective view on a reduced scale.

Figure 5 is a detail view of the rotary shutter, and attachments—the full lines showing the normal working position and dot and dash lines the safety position.

Figure 6 is a detail view of the block which receives the shutter control lever pin.

L shows one of the rays of the light which is projected through the film.

1 is a part of the machine casing, near which I support my apertured plate 2 which carries at each side a wing 3, set rearwardly therefrom by webs or distance pieces $3^a$. Plate 2 has a hole $2^a$ for the rays of light, all light mentioned herein being light projected towards the film to produce the picture, but the said light is intercepted for safety purposes when an emergency arises, as herein explained. Each wing is supported between upper and lower guide rollers, inner guide rollers being flanged and marked 4, $4^a$, and outer guide rollers 5, $5^a$, near the respective sides of the machine. Each guide roller is carried on an axle projecting from brackets 6 and 7 respectively carried at each side on a shaft 8, each shaft being carried by brackets 9 so that it may be slidably adjusted longitudinally, and be secured in position by set screws 10; but the shafts are not rotatable, a groove 11 on each being engaged by bracket pins 12.

The brackets 6 and 7 have pins 13 engaging groove 11, and are resiliently held between spring washers 14, the tension on which is adjustable, by means of a nut 15 on shaft 8. Each wing 3 has at $3^b$ a flexible connection 16, which passes through a guide eye 17 and over a guide roller 18, to a controlled slidable stem 19, mounted in a bracket 20 fixed to casing 1, the control means including a spiral spring 21, the pressure of which is at one end on nut 22 on the screw-threaded part of the stem, this nut being adjustable. A nut 23 is also adjustable on the latter part of stem 19 to limit, during expansion of spring 21, the stem movement during movement of the apertured plate 2.

I provide above and below the plate 2, buffers 24 having suitable resilience, the upper to prevent jar of the apertured plate, and the lower to limit movement of the plate when it changes its position.

Upon one wing 3 (which has for the purpose holes 3°) I provide a bracket 25, shown in Figure 2 (not visible in Figure 3) upon which is hinged a main apertured gate plate 26, which is of known construction, and which has at its upper part bearings 27 supporting an axle 27ª carrying film guide rollers 28.

At the rear of plate 26 is the rear apertured gate plate 31 having the hole 31ª and connected by a stud 29 to plate 26, and having distance stops 30 as commonly used. Plate 26 is held in the closed position shown by carrying a spring catch 32, which bears against an abutment pin 33 which projects through a hole in plate 26 and extends from a wing 3. Plate 31 carries, at its front, springs 34—see Figures 2 and 3—which exert pressure on lugs 35 which extend from shoes 36.

It is between shoes 36 and plate 2 that the film (partly shown and marked 37) is drawn during the operation of the cinematograph. I do not illustrate the parts numbered 25 to 36 separately because they are known devices. In the position in Figure 2, which I call the light transmitting position, there are five holes in register, namely, in order from the front, that of the apertured plate 2, main gate plate 26, rear gate plate 31, shutter 46 hereinafter mentioned, and the masking plate 38, the said shutter and masking plate not having hitherto been used as safety devices to prevent, or as means to regulate light transmission. The shutter is rotatable, but the masking plate will not be moved during ordinary exhibiting and stoppages of film.

Rearwardly of plate 31 is the apertured masking plate 38 connected by a hinge 39 at one side to a bracket 40, and held closed against a buffer 41 by a latch 42 on plate 38 which engages a bracket 43. In plate 38 is the light transmission aperture 44, which masks the picture, and which is to the rear of the aperture 45 in the shutter 46, when the latter is in the illustrated position, in which rays of light pass through it.

Shutter 46 is mounted on an axle 47 which projects from plate 38, and will be rotated or swung over a suitable arc by means of a spring 48 as hereinafter explained. The spring extends from a lever 49, and engages a lug 50 on the shutter, movement of which is limited by a stop 51, see Figure 5, located in the path of one or the other of two shutter lugs 52.

Stops 57 on plate 38 are provided to limit movement of lever 49. A projection shown as a pin 53 extends from lever 49 into a recess 54, see Figure 6, in a block 55, which is attached to plate 31. When vertical movement of apertured plate 2 occurs, it is transmitted to the block 55 and thus the pin 53 and the latter moves lever 49 which causes spring 48 to rotate shutter 46, both positions of lever and spring being illustrated. I provide near recess 54 a spring pawl 56, Figure 6 so that if pin 53 becomes disengaged from recess 54 (taking the position 53ª) it will readily re-enter the recess. A rearmost shutter 58 is indicated in dotted lines in Figure 3, it being usable at will. It can be operated in known manner by connections to a centrifugal governor.

In the operation of this improved cinematograph, when the film 37 is moving in the ordinary manner (downwardly in the case illustrated) friction by the film upon apertured plate 2 and shoes 36 draws these and their attached parts (including parts 3 and 25 to 36, block 55 having pin 53, and lever 49) downwardly, notwithstanding the resistance of springs 21, into the position shown in the drawings.

If the film breaks, or if its advance is arrested by reason of a worn or torn part of the film meeting the gear which engages the film edges then the tension on the film will cease, and apertured plate 2, and also the aforesaid parts thereto connected will be retracted (in this case upwardly) by the springs 21, thus causing shutter 46 to locate its aperture 45 in about the position shown by dotted lines in Figure 5, shutting off light through aperture 44, and therefore screening the light rays from the film, and producing safety conditions. It is sufficient to shut off the light by the movement of one aperture, so that the apertures in parts 31 and 26, although they alter their position, do not necessarily get wholly out of the light transmitting position as their apertures in practice may be long or large.

What I claim is:—

1. In a cinematograph, a rotatable safety shutter combined with means which by friction of the film in motion are located so as to hold the shutter in a position which allows light to be projected through the shutter and film, the said frictionally positioned means containing an apertured plate connected to spring means, the plate being connected to the shutter so that movement of the plate by the spring means causes the safety shutter to turn on its axis to intercept the light and prevent the latter striking the film.

2. In a cinematograph, a safety shutter combined with means which by friction of the film in motion are located so as to hold the shutter in a position which allows the light to be projected through the shutter and the film, the said frictionally positioned means containing an apertured plate connected to spring means, the plate being connected to the shutter so that movement of the plate by the spring means causes the safety shutter to intercept the light and prevent the latter striking the film, and means for guiding the apertured plate.

3. In a cinematograph, a safety shutter combined with means which by friction of the film in motion are located so as to hold the shutter in a position which allows light to be projected through the shutter in the film, the said frictionally positioned means containing an apertured plate connected to spring means, the plate being connected to the shutter so that movement of the plate by spring means causes the safety shutter to intercept the light, and prevent the latter striking the film, and resiliently mounted rollers for guiding the apertured plate.

4. In a cinematograph, a supporting plate having an aperture to permit the passage of light rays to the film, a rotatable shutter mounted on said plate and having a window adapted to align with said aperture, said shutter being rotatable in a plane parallel to the plate, a reciprocating plate mounted forwardly of the shutter and having a window adapted to align with the window of the shutter during the normal operation of the machine, resilient means normally tending to move the reciprocating plate in one direction, friction means on the reciprocating plate adapted to engage the film for moving the reciprocating plate in the opposite direction, and means connecting the reciprocating plate to the shutter for causing turning of the shutter when the reciprocating plate is moved under the influence of said resilient means.

5. In a cinematograph as claimed in claim 4, guide rollers for causing the reciprocating plate to move in a rectilinear path.

6. In a cinematograph, a slidable apertured plate, a film gate hinged to it, a film masking plate rearward of the gate, and on the masking plate a safety shutter which is rotatable to intercept light projected towards the film.

7. The construction in claim 6 but with the slidable apertured plate and the film gate provided with means to set in light intercepting position and operative position as required a safety shutter carried on the masking plate.

8. The construction in claim 6 and with the slidable apertured plate and the film gate provided with means to locate in light intercepting position and in operative position, as required, a safety shutter carried on the film masking plate, a block on the rear of said plate, a recess in the block, a pin engaging the recess, the recess having a spring pawl to admit the said pin, when the latter becomes disengaged from the said recess.

9. In a cinematograph, a vertically slidable apertured plate having wings, guide rollers engaging the wings, spring means to draw the plate into safety position, stops to limit the plate movement, a film gate hinged to the plate, and carrying film directing rollers and friction shoes, a masking plate outwardly of the film gate, a rotary safety shutter inward of the masking plate, and means for transmitting movement from the apertured plate and film gate to set the safety shutter.

10. In a cinematograph as claimed in claim 4, guide rollers for the reciprocating plate, and adjustable means supporting the guide rollers and movable in a direction perpendicular to the reciprocating plate.

In witness whereof I have hereunto set my hand.

ARTHUR LESLIE DITTMER.